United States Patent
Gu (10) Patent No.: US 11,352,089 B1
(45) Date of Patent: Jun. 7, 2022

(54) WATER BOTTLE HOLDER ASSEMBLY FOR BICYCLES

(71) Applicant: Haidong Gu, Pomona, CA (US)

(72) Inventor: Haidong Gu, Pomona, CA (US)

(73) Assignee: CYCLINGDEAL USA, INC., Pomona, CA (US)

( * ) Notice: Subject to any disclaimer, the term of this patent is extended or adjusted under 35 U.S.C. 154(b) by 0 days.

(21) Appl. No.: 17/334,779

(22) Filed: May 30, 2021

(51) Int. Cl.
  *B62J 11/04* (2020.01)
  *B62J 9/26* (2020.01)

(52) U.S. Cl.
  CPC . *B62J 11/04* (2020.02); *B62J 9/26* (2020.02)

(58) Field of Classification Search
  CPC .................. B62J 11/04; B62J 9/14; B62J 9/26
  USPC .......................................... 224/427, 448, 414
  See application file for complete search history.

(56) References Cited

U.S. PATENT DOCUMENTS

| | | | | |
|---|---|---|---|---|
| 4,643,343 A | * | 2/1987 | Goldman | B62J 9/26 224/427 |
| 10,183,716 B2 | * | 1/2019 | Chuang | B62J 9/26 |
| 2020/0255081 A1 | * | 8/2020 | Bogenschuetz | B62J 11/04 |
| 2021/0197912 A1 | * | 7/2021 | Silfen | B62J 9/30 |
| 2022/0017171 A1 | * | 1/2022 | Chuang | B62J 9/27 |

FOREIGN PATENT DOCUMENTS

TW        M457680      * 7/2013

* cited by examiner

*Primary Examiner* — Justin M Larson (57) ABSTRACT

A water bottle holder assembly includes a board and a link extending from the board. The board includes two slots defined axially therethrough. The link includes a connection end which has a first toothed face. Two clamp units are connected to the board, and each clamp unit includes two blocks. Each of the blocks includes a passage through which a first bolt extends, and the first bolt extends through the slot and is connected with a nut. The two blocks are pivotably connected to each other at one end so as to clamp the seat rail between the two blocks. A support unit includes a plate with an extension extending laterally from the plate. A water bottle holder is connected to the plate. The extension includes an engaging part which has a second toothed face adjustably engaged with the first toothed face so that the holder is angularly adjustable.

5 Claims, 9 Drawing Sheets

WATER BOTTLE HOLDER ASSEMBLY FOR BICYCLES

BACKGROUND OF THE INVENTION

1. Fields of the Invention

The present invention relates to an accessory for bicycles, and more particularly, to a water bottle holder assembly for bicycles.

2. Descriptions of Related Art

The conventional water bottle storage is located behind the seat so as to position the water bottle. Taiwanese Utility Model No. M457680 discloses a water bottle holder assembly that include two sets of baskets for two water bottles to be positioned therein. The water bottle holder assembly includes a connecting piece, a frame body, etc. The connecting piece has an engaging part and a connecting part. The engaging part is combined with the two seat rails by a first clip and a second clip. The connecting part includes two links extending from the first clip. Each link has a plurality of holes. The frame includes a fixing piece and two extension pieces extending from both sides of the fixing piece. The two extension pieces are provided with plural bores respectively, and plural connecting bolts pass through the plural bores and are locked in the holes of the two links. The fixing piece has a plurality of fixing surfaces for coupling the bottle holder.

However, the bottle holders cannot be angularly adjusted relative to the bicycle seat, such that some of the users may feel uncomfortable when reaching the water bottles.

The present invention intends to provide a water bottle holder assembly for bicycles, and the bottle holders can be angularly adjusted so as to eliminate shortcomings mentioned above.

SUMMARY OF THE INVENTION

The present invention relates to a water bottle holder assembly for bicycles, and comprises a board having two slots defined axially through the board. The board includes a first face and a second face located opposite to the first face. A link extends from the second face of the board and includes a connection end. A threaded hole is defined through the connection end. Two clamp units are connected to the first face of the board. Each clamp unit includes two blocks. Each of the blocks includes a passage defined therethrough. Each of the two blocks includes a lug formed to one end thereof, and a pin extends through the two respective lugs to pivotably connect the two blocks of each clamp unit so that the two blocks are pivoted about the pin to be away from each other or to be closed to each other. A first bolt extends through the two respective passages of the two blocks of each clamp unit and the slot, and is connected with a nut so as to connect the clamp unit to the first face of the board. A support unit includes a plate, an extension extending laterally from the plate and including an engaging part. A second bolt extends through the engaging part and is connected to the threaded hole to secure the engaging part to the connection end of the link.

The primary object of the present invention is to provide a water bottle holder assembly wherein the water bottle holders are angularly adjustable relative to the seat.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 7, the water bottle holder assembly 10 of the present invention comprises a board 11 which includes two slots 111 defined axially through the board 11. The board 11 includes a first face 112 and a second face 113 which is located opposite to the first face 112. The width "W1" of the first face 112 is shorter than the width "W2" of the second face 113, and an inclined face 114 formed between the first and second faces 121, 113. A link 12 extends from the second face 113 of the board 1I and includes a connection end 121. A threaded hole 122 is defined through the connection end 21. The connection end 121 includes a first toothed face 1211 formed around the threaded hole 122.

Two clamp units 20 are connected to the first face 112 of the board 11, and each clamp unit 20 includes two blocks 21, 24. Each of the blocks 21, 24 includes a passage 211 defined therethrough. Each of the two blocks 21, 24 includes a lug 212 formed to one end thereof, and a pin 22 extends through the two respective lugs 212 to pivotably connect the two blocks 21, 24 of each clamp unit 20, so that the two blocks 21, 24 are pivoted about the pin 22 to be away from each other or to be closed to each other. A first bolt 23 extends through the two respective passages 211 of the two blocks 21, 24 of each clamp unit 20 and the slot 111, and is connected with a nut 231 so as to connect the clamp unit 20 to the first face 112 of the board 11.

A support unit 30 includes a plate 31, and an extension 32 extends laterally from the plate 31 and includes an engaging part 321. The engaging part 321 includes a second toothed face 3211 which is engaged with the first toothed face 1211. A second bolt 33 extends through the engaging part 321 and is connected to the threaded hole 122, and the first and second toothed faces 1211, 3211 are engaged with each other to secure the engaging part 321 to the connection end 121 of the link 12. The plate 31 includes two bores 311 respectively defined through two ends thereof, and the extension 32 is located at a middle position between the two bores 311.

Figure 4:
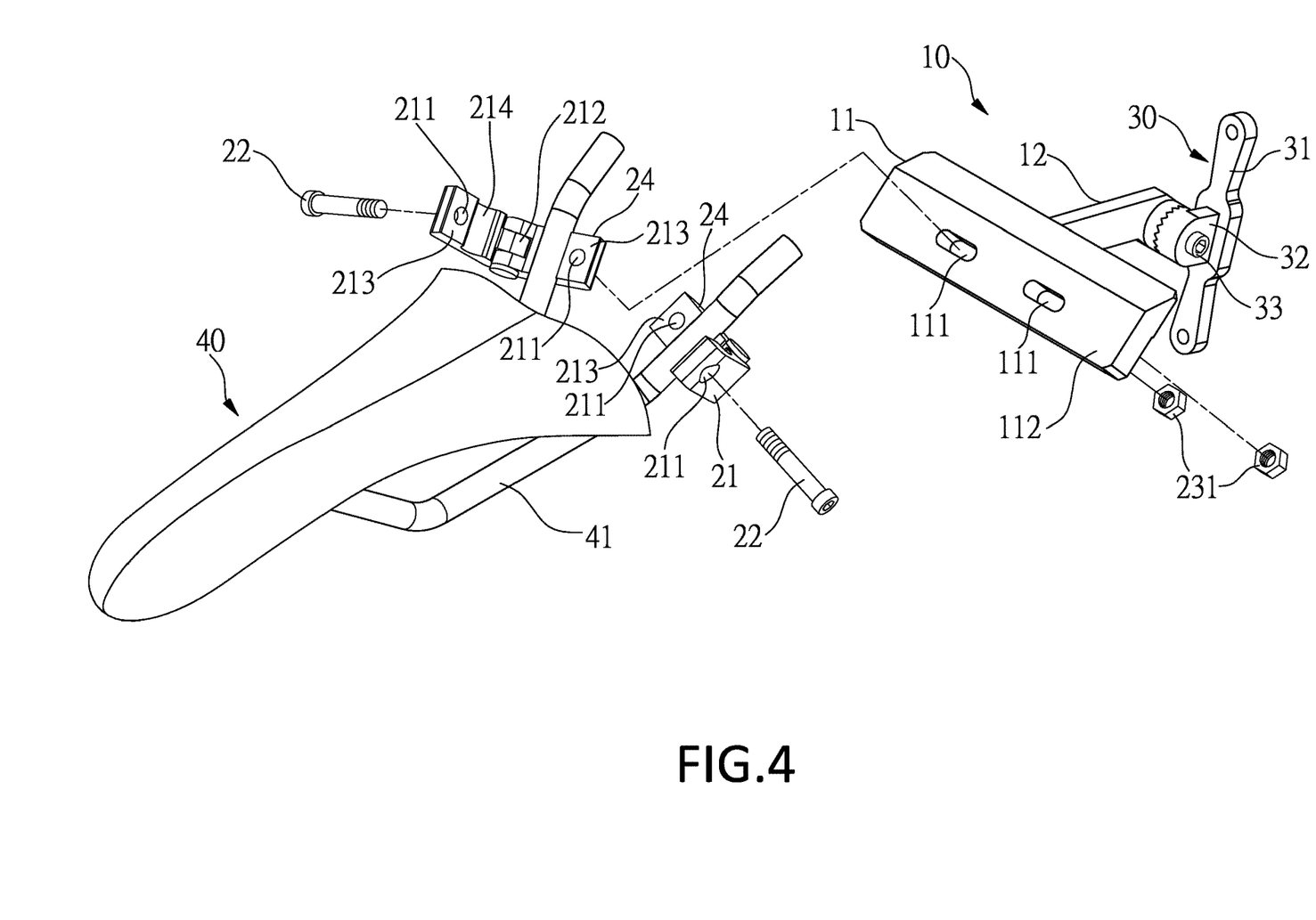
FIG. 4 illustrates the water bottle holder assembly of the present invention is to be connected to the seat rails.
Figure 5:
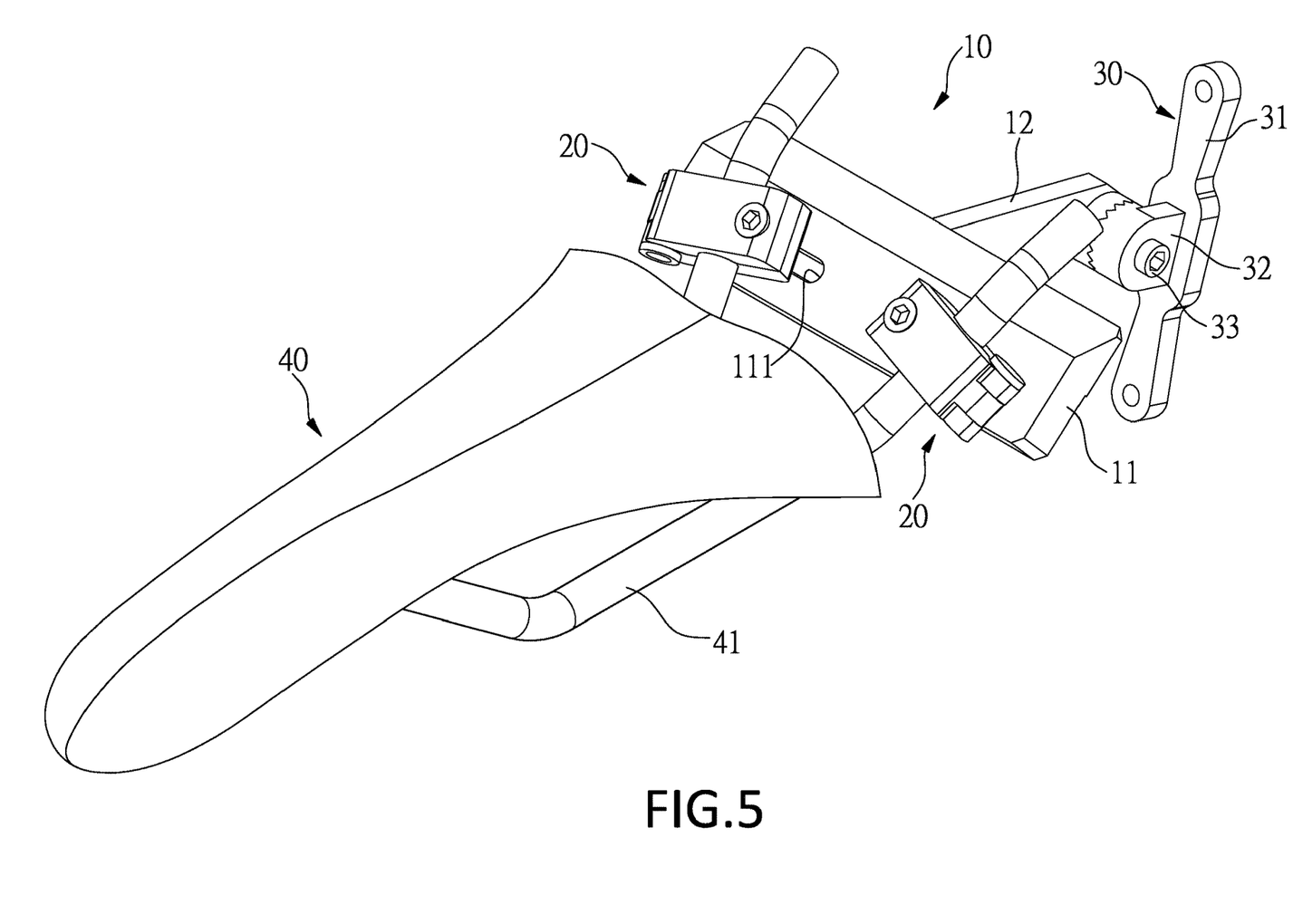
FIG. 5 shows that the water bottle holder assembly of the present invention is connected to the seat rails.

Each of the two blocks 21, 24 includes a clamp face 213, and the two respective clamp faces 213 of the two blocks 21, 24 face each other. The passage 211 is defined through the two respective clamp faces 213 of the two blocks 21, 24. Each of the clamp faces 213 of the two blocks 21, 24 includes a groove 214 defined therein, and the groove 214 is located between the passage 21 and the lug 212. The groove 214 is located in the clamp face 213 of each block 21/24. When the two respective clamp faces 213 of the two blocks 21, 24 are matched with each other, the two respective grooves 214 of the two blocks 21, 24 form a circular path in which one of the two seat rails 41 of the seat 40 is received as shown in FIGS. 4 and 5. The two blocks 21, 24 are securely combined with each other by the first bolt 23 and the nut 231.

Figure 6:
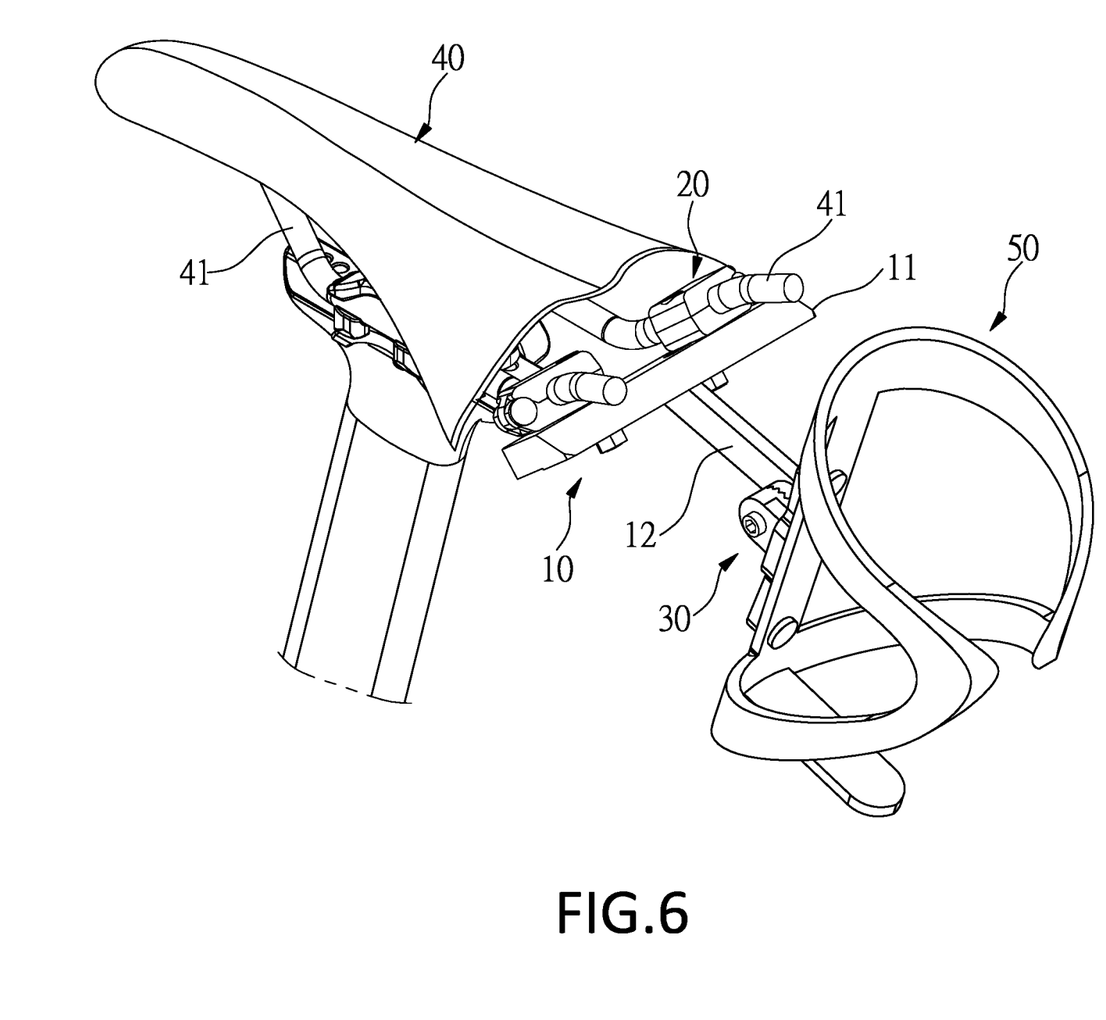
FIG. 6 shows that the water bottle holder assembly of the present invention is connected to the seat rails, and a water bottle holder is connected to the support unit of the water bottle holder assembly of the present invention.

As shown in FIG. 6, the water bottle holder 50 is connected to the plate 31 of the support unit 30 extending two securing parts through the water bottle holder 50 and connected to the two bores 311 of the plate 31. The link 12 extends from the rear end of the seat 40, and the plate 31 is located at an upright position so that the water bottle holder 50 is located to be easily accessed.

Figure 7:
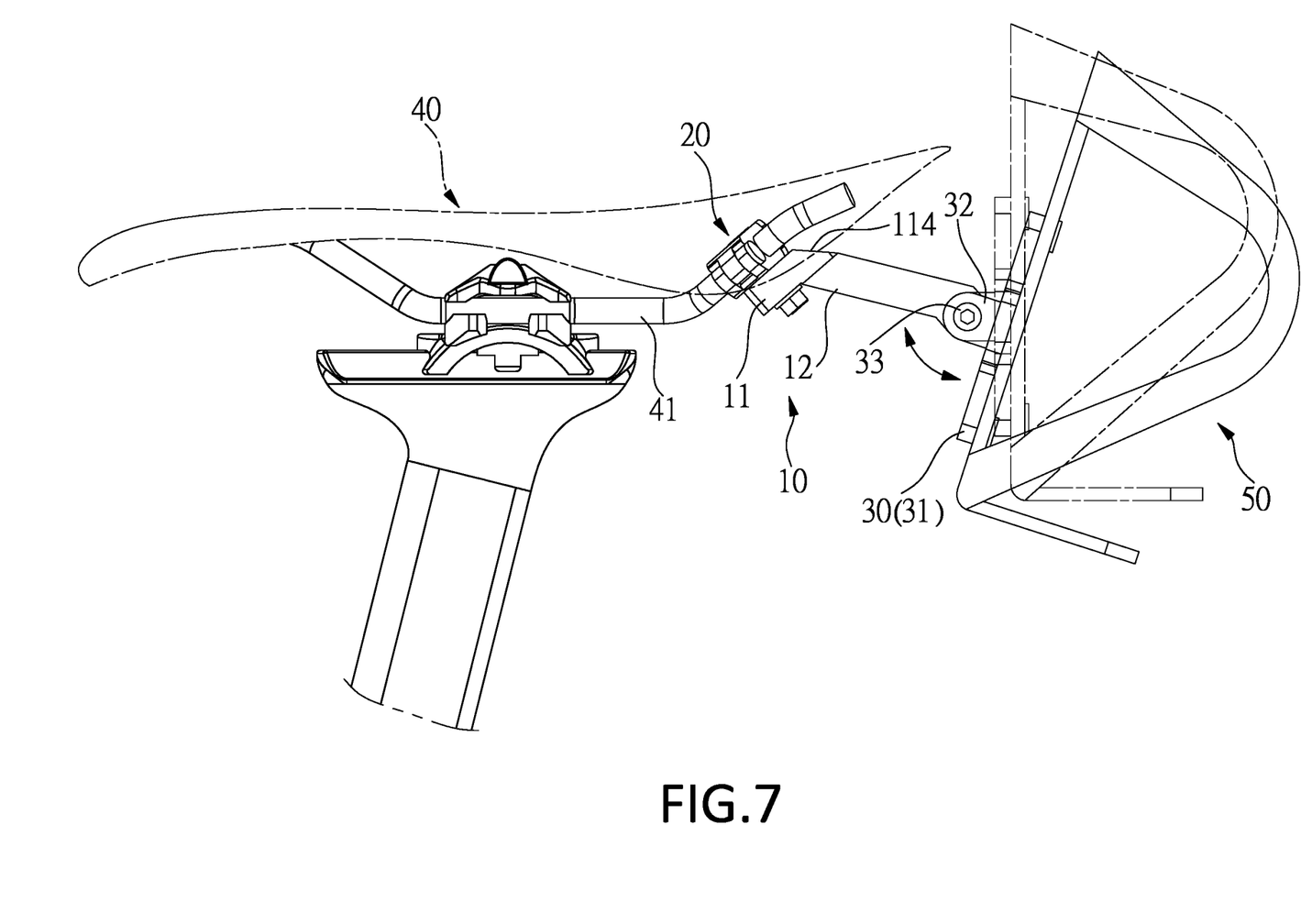
FIG. 7 shows that the water bottle holder is angularly adjustable.

As shown in FIG. 7, by loosening the second bolt 33, the plate 31 together with the water bottle holder 50 are able to be pivoted about the second bolt 33 as shown by the arrow heads in FIG. 7. When the water bottle holder 50 is set at a desired position, the second bolt 33 is tightened, so that the water bottle holder 50 is set to a desired position.

Figure 3:
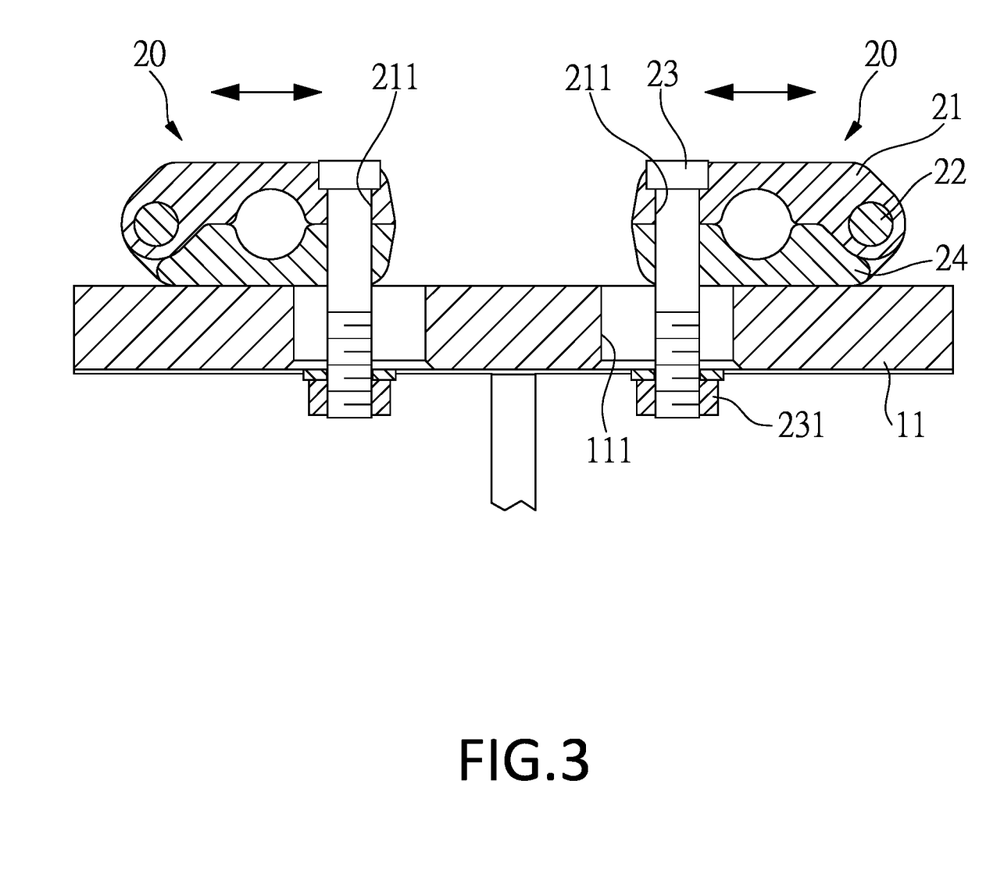
FIG. 3 is a cross sectional view, taken along line III-III in FIG. 1.

As shown in FIG. 3, the first bolt 23 is able to move along the slot 111 which is an elongate slot so that the two clamp units 20 can be adjusted so as to be connected to the seat rails 41 of different sizes. As shown in FIG. 7, the inclined face 114 of the board 11 faces upward and avoids interference by the seat rails 41 when the clamp units 20 clamp the seat rails 41.

It is noted that the engagement between the first and second toothed faces 1211, 3211 ensure that the support unit 30 does not rotated relative to the link 12, so that the water bottle holder 50 is secured and does not swing back and forth.

Figure 1:
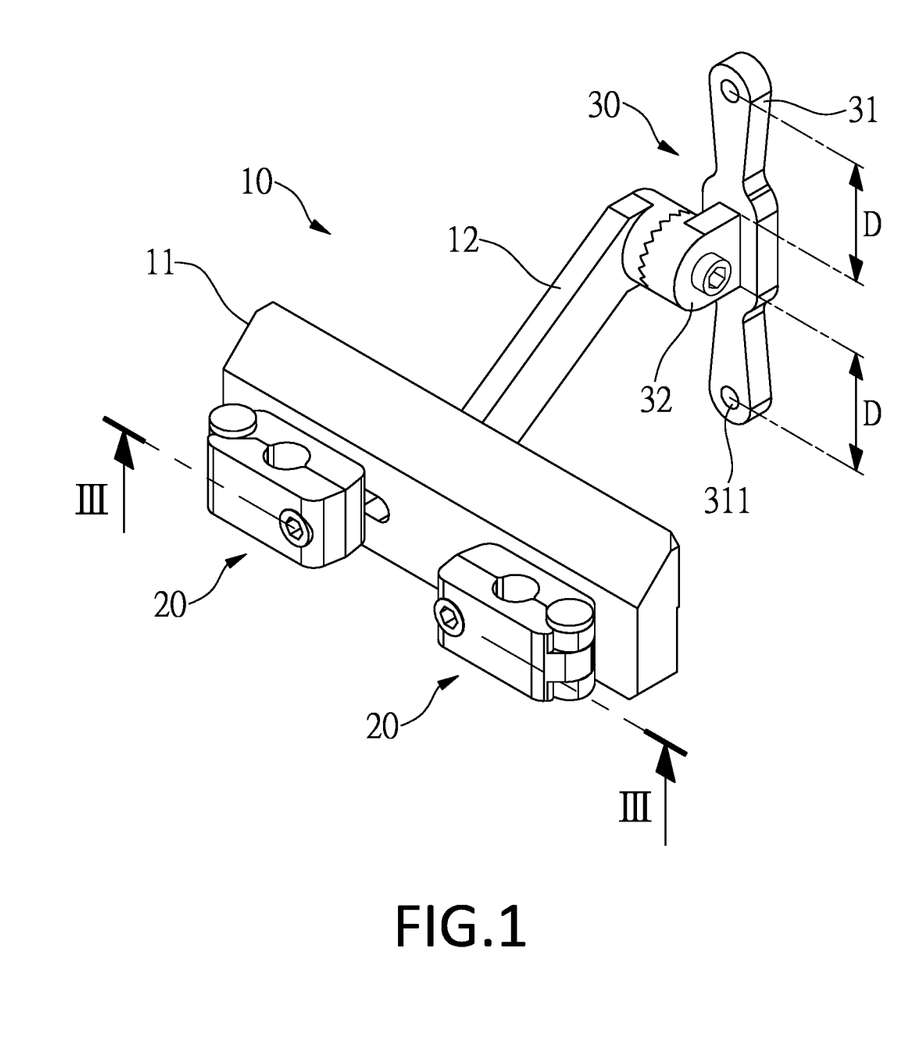
FIG. 1 is a perspective view to show the water bottle holder assembly of the present invention.
Figure 2:
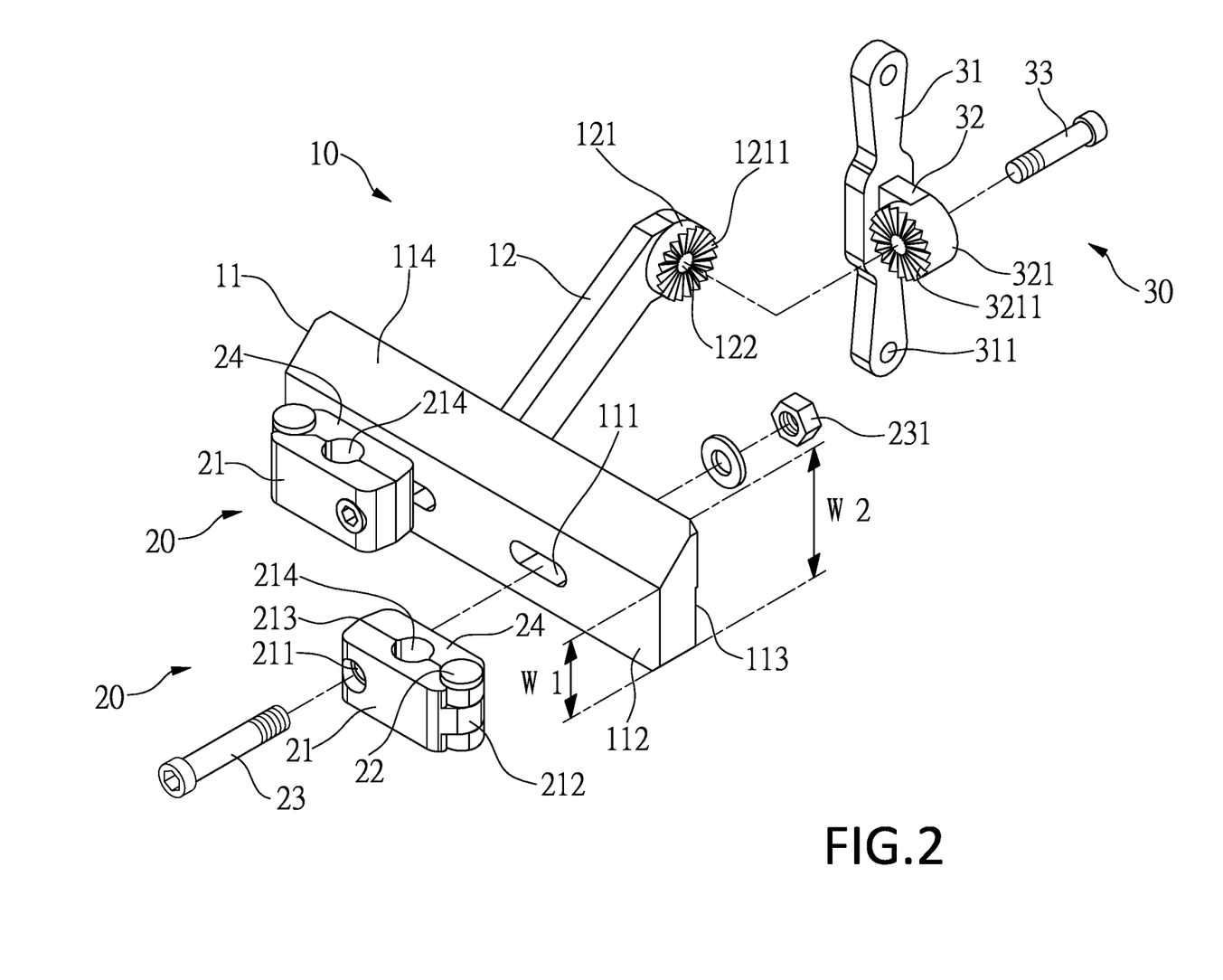
FIG. 2 is an exploded view of the water bottle holder assembly of the present invention.

Because the extension 32 is located at a distance "D" from each of the two bores 311 as shown in FIG. 1, so that the water bottle holder 50 is well supported by the extension 32.

Figure 8:
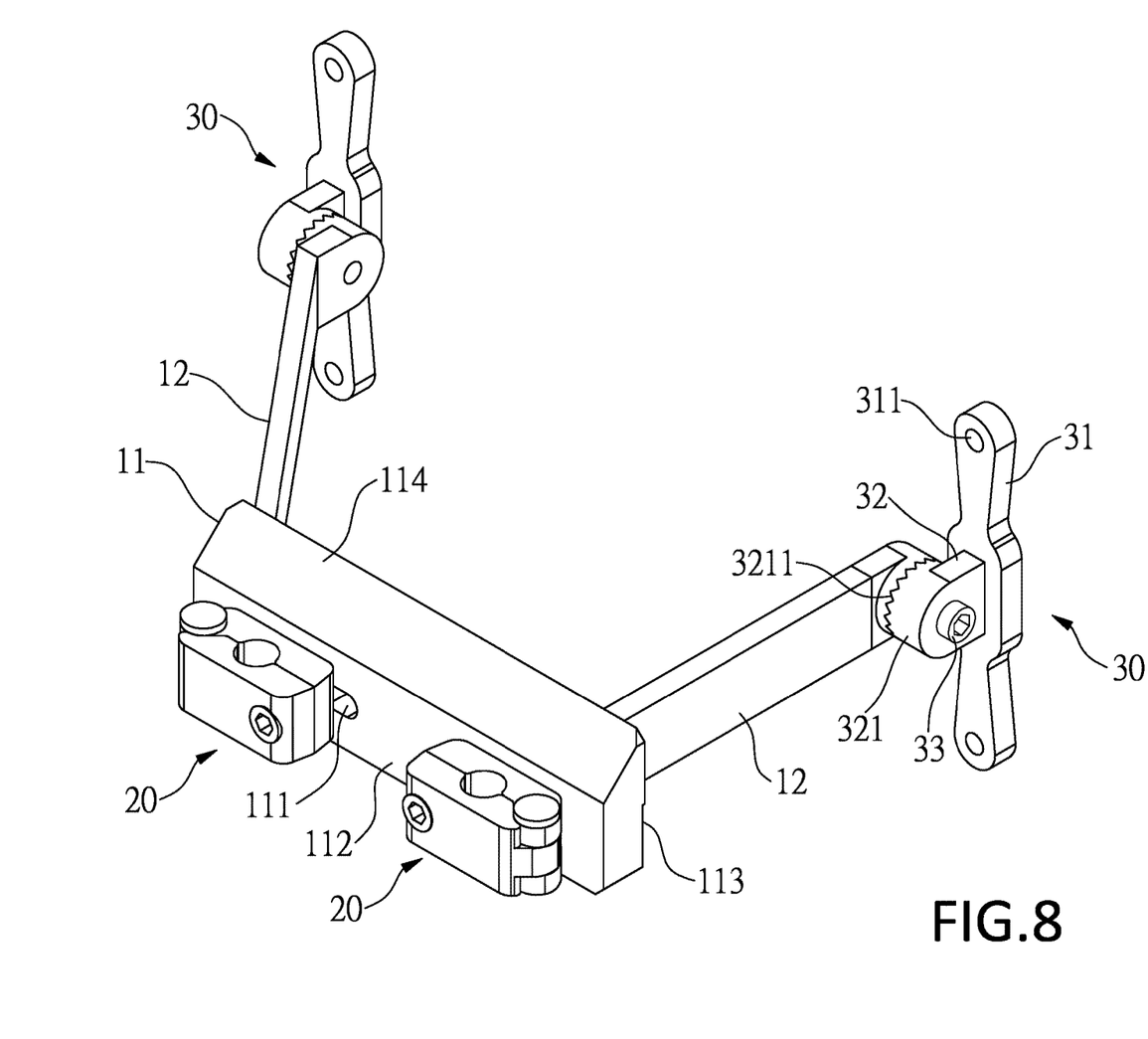
FIG. 8 is a second embodiment of the water bottle holder assembly of the present invention.
Figure 9:
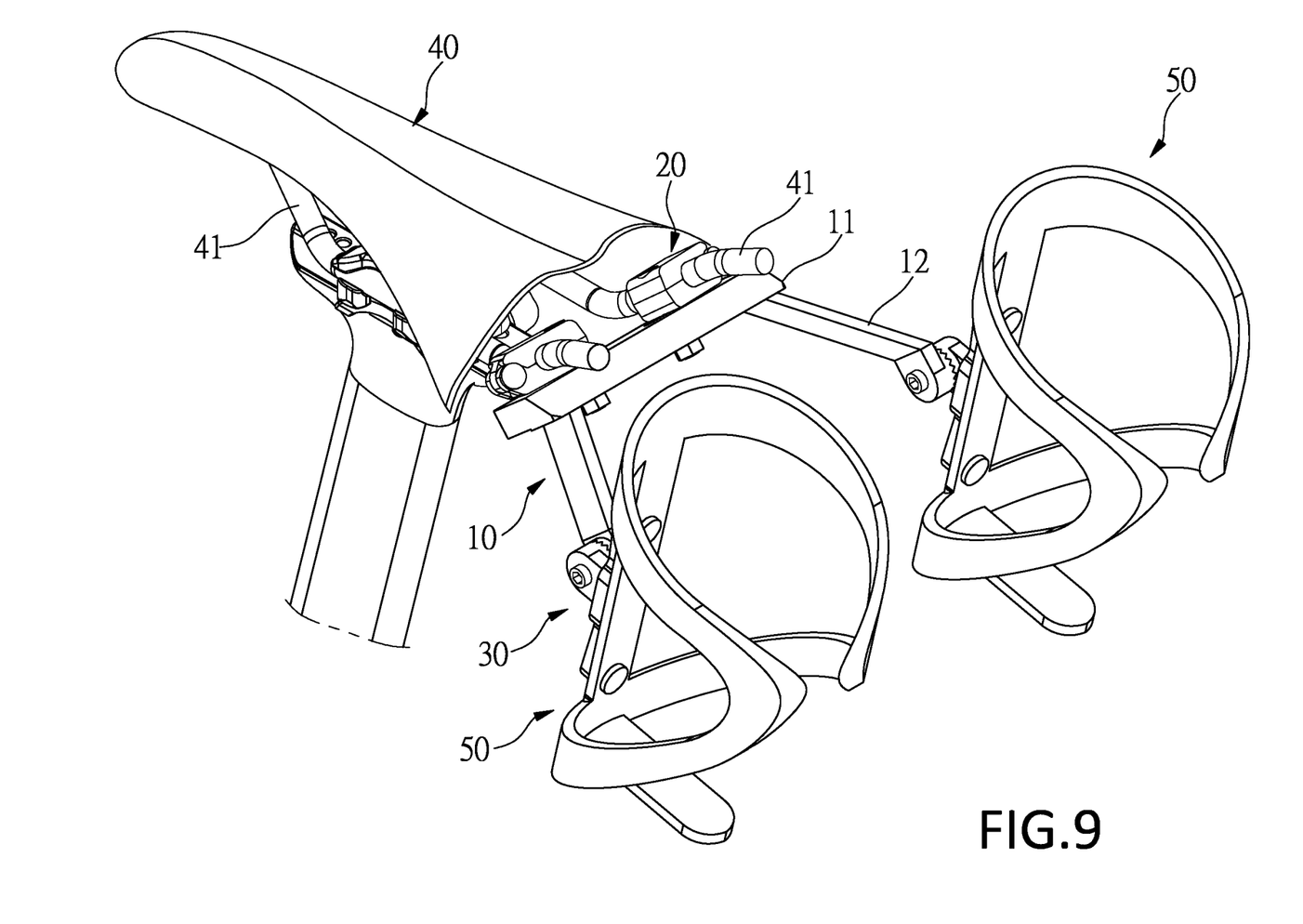
FIG. 9 shows that two water bottle holders are connected to the second embodiment of the water bottle holder assembly of the present invention.

Referring to FIGS. 8 and 9, the second embodiment of the present invention is disclosed, wherein the differences of the second embodiment from the first embodiment are that there are two links 12 connected to the board 11. Each link 12 is connected to a support unit 30 so as to be connected with two water bottle holders 50, and each water bottle holder 50 is angularly adjustable.

The advantages of the present invention are that the plate 31 is pivotable relative to the link 12 by operation to the second bolt 33, so that the water bottle holder 50 can be angularly adjustable.

The clamp units 20 are movable along the two slots 111 of the board 11 so that the two clamp units 20 are able to be connected to the seat rails 41 of different sizes.

While we have shown and described the embodiment in accordance with the present invention, it should be clear to those skilled in the art that further embodiments may be made without departing from the scope of the present invention.

What is claimed is:

1. A water bottle holder assembly comprising:
   a board having two slots defined axially through the board, the board including a first face and a second face which is located opposite to the first face;
   a link extending from the second face of the board and including a connection end, a threaded hole defined through the connection end;
   two clamp units connected to the first face of the board, each clamp unit including two blocks, each of the blocks including a passage defined therethrough, each of the two blocks including a lug formed to one end thereof, a pin extending through the two respective lugs to pivotably connect the two blocks of each clamp unit so that the two blocks are pivoted about the pin to be away from each other or to be closed to each other, a first bolt extending through the two respective passages of the two blocks of each clamp unit and the slot and connected with a nut so as to connect the clamp unit to the first face of the board, and
   a support unit including a plate, an extension extending laterally from the plate and including an engaging part, a second bolt extending through the engaging part and connected to the threaded hole to secure the engaging part to the connection end of the link.

2. The water bottle holder assembly as claimed in claim 1, wherein a width of the first face is shorter than a width of the second face, an inclined face formed between the first and second faces.

3. The water bottle holder assembly as claimed in claim 1, wherein the connection end includes a first toothed face formed around the threaded hole, the engaging part includes a second toothed face which is engaged with the first toothed face.

4. The water bottle holder assembly as claimed in claim 1, wherein each of the two blocks includes a clamp face, the two respective clamp faces of the two blocks face each other, the passage is defined through the two respective clamp faces of the two blocks, each of the clamp faces of the two blocks includes a groove defined therein, the groove is located between the passage and the lug, the groove is located in the clamp face of each block.

5. The water bottle holder assembly as claimed in claim 1, wherein the plate includes two bores respectively defined through two ends thereof, the extension is located at a middle position between the two bores.

* * * * *